United States Patent

Oldermann et al.

[11] Patent Number: 6,067,213
[45] Date of Patent: *May 23, 2000

[54] TAPE STEPPER FOR TRANSVERSE TRACK POSITIONING IN A MULTITRACK TAPE RECORDER

[75] Inventors: Klaus Oldermann, Villingen-Schwenningen; Martin Storz, VS-Villingen, both of Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/890,264

[22] Filed: Jul. 9, 1997

[30] Foreign Application Priority Data

Jul. 12, 1996 [EP] European Pat. Off. ............ 96401555

[51] Int. Cl.$^7$ .................................................. G11B 15/60
[52] U.S. Cl. .................................. 360/130.21; 360/130.2
[58] Field of Search ................................. 360/69, 71, 75, 360/72.1, 77.12, 78.02, 96.3, 130.2, 130.21, 130.23; 226/15–23

[56] References Cited

U.S. PATENT DOCUMENTS

| | | | |
|---|---|---|---|
| 2,938,962 | 5/1960 | Konins et al. . | |
| 3,697,676 | 10/1972 | Protas | 360/107 |
| 4,212,422 | 7/1980 | Rauchfuss, Jr. et al. | 226/196 |
| 4,363,042 | 12/1982 | Kimura et al. | 360/71 |
| 4,453,659 | 6/1984 | Torpey | 226/20 |
| 4,573,619 | 3/1986 | Grant | 226/190 |
| 4,582,235 | 4/1986 | Schulz | 226/20 |
| 4,913,328 | 4/1990 | Schulz | 226/21 |
| 4,964,557 | 10/1990 | Sarkisian et al. | 226/18 |
| 5,206,771 | 4/1993 | Katon et al. | 360/71 |
| 5,333,770 | 8/1994 | Kano et al. | 226/15 |
| 5,343,338 | 8/1994 | Murata et al. | 360/69 |
| 5,395,067 | 3/1995 | Kano et al. | 242/344 |
| 5,434,732 | 7/1995 | Schwarz et al. . | |
| 5,870,240 | 2/1999 | Jun | 360/71 |

FOREIGN PATENT DOCUMENTS

| | | |
|---|---|---|
| A390555 | 3/1990 | European Pat. Off. . |
| A565918 | 10/1993 | European Pat. Off. . |
| A2355354 | 1/1978 | France . |
| A8100781 | 3/1981 | WIPO . |
| A8102804 | 10/1981 | WIPO . |
| 9516986 | 6/1995 | WIPO . |

*Primary Examiner*—William Kilmowicz
*Attorney, Agent, or Firm*—Joseph S. Tripoli; Joseph J. Laks; Daniel E. Sragow

[57] ABSTRACT

The invention concerns a device which comprises a device for displacing to transversely position a multitrack tape in front of a reading and/or writing head. The magnetic tape carries a plurality of elementary tracks which are grouped in several bundles. These bundles are selectively accessed using the device for displacing. The writing and/or reading head can write and/or read information from elementary tracks contained in one bundle at a time. The device for displacing comprise a tape guide acting on longitudinal edges of the tape and transversely translating the tape. Furthermore they comprise either a movable tape reels platform or movable pins to accommodate for the transverse tape displacement.

16 Claims, 5 Drawing Sheets

TAPE STEPPER FOR TRANSVERSE TRACK POSITIONING IN A MULTITRACK TAPE RECORDER

The invention relates to multitrack tape recorders. A prior art multitrack tape recorder is for example described in "High-Data-Rate, High-Density Magnetic Tape Recorder Using Matrix Writing Head And Kerr Reading Head, J. C. Lehureau, J.-P. Castera, Thirteenth IEEE Symposium on Mass Storage Systems, 1994 IEEE". A magnetic writing head is used to write in longitudinal tracks carried on a magnetic tape. The fixed magnetic head comprises active parts arranged in a two dimensional matrix, each active part being used to access one track on the tape. An associated optical system comprising a laser diode, cylindrical focusing optics, a Kerr transducer, imaging optics, and a CCD array camera is used to readout the tracks. This prior art configuration was designed to write and/or read information in a sequential manner to and from a bundle comprising all the tracks. Therefore all the tracks of the bundle contained across the width of the magnetic tape may be accessed simultaneously using the fixed magnetic head and the associated optical system. For some application it might be useful to write and/or read information in narrower bundles comprising a few tracks only. This allows e.g. to copy information contained in a first bundle in a second bundle adjacent to the first for high security in information storage and retrieval. The goal of writing and/or reading narrower bundles may be achieved by using only a few of the available active parts of the magnetic head and a limited range of the CCD array camera. However the cost of the magnetic head and of the optical system is strongly dependent on the number of active parts and on the required cell range of the CCD array camera; they may prove to be very expensive when the number of tracks across the tape width increases. A typical figure for the number of tracks may amount to 1024 tracks. With the objective of addressing bundles with fewer tracks simultaneously but also to selectively access a plurality of bundles across the total tape width, a multitrack tape recorder solution is sought in which a large number of tracks may be recorded and/or read using a cheaper magnetic head and/or optical system. This means on one hand that the solution will be adapted to the use of a magnetic head with a restricted number of active parts and on the other hand that the tape and the head will have to be variably positioned relatively to each other.

According to the present invention a solution to above mentioned problem is found in a device for reading and/or recording from/on a magnetic tape, said magnetic tape having a longitudinal axis along which extends a magnetic layer magnetizable along a plurality of elementary tracks forming at least a bundle oriented parallel to said longitudinal axis, said device comprising a take up and supply reel mechanism, tape transportation means associated with said reel mechanism for causing said tape to slide against a magnetic head having a plurality of active parts for respectively writing said plurality of elementary tracks, said magnetic head having a predetermined gap azimuth in relation to said longitudinal axis and said tape being in intimate contact with all active parts of said head. The device further comprises, for achieving a bundle selection from said tape to be recorded or recorded with at least two of said bundles across a width of said tape, means for displacing in a transverse direction said tape in relation with said head. Thus the tape is transversely displaced in front of the magnetic head. This allows to use a magnetic head with fewer active parts since at least two bundles of elementary tracks are accessed selectively. Such a magnetic head may be less costly than the magnetic head known from prior art.

A transverse tracking problem subsists when reading the narrow elementary tracks carried by the multitrack tape. A range of a transverse tracking movement lies in an order of magnitude smaller than that of a transverse positioning movement. In order to tackle the transverse tracking problem a device according to the present invention advantageously comprises for reading said bundle, tracking means causing said elementary tracks to be kept in register with track reading means. The tracking means allow a very precise positioning and may compensate for a positioning error of the means for displacing.

Further advantageously in a device according to the invention said tracking means perform a movement of said track reading means transversely of said longitudinal axis. Such tracking means may easily be combined with a servo loop circuit which evaluates information read from the tracks to determine a mistracking.

Also further advantageously in a device according to the invention said tape has longitudinal edges and said means for displacing comprise a tape guide acting on said longitudinal edges, said tape guide causing said tape to undergo a translation thereby preserving said predetermined gap azimuth. The tape guide may have a relatively low mass making it easy to be displaced and relatively insensitive to sudden movements of the device, e.g. as caused by external mechanical shocks on the device.

Preferably in a device according to the invention said tape guide comprises a pair of guidance rollers with flanges, each guidance roller freely rotating about a nut bearing, and screw means for transversely and simultaneously displacing said nut bearings. The rotating guidance rollers minimize wear of the tape during tape transportation.

Also preferably in a device according to the invention, said screw means are actuated with a stepper motor. A relatively precise and yet prompt positioning of the tape is the result.

Further preferably in a device according to the invention said means for displacing comprise a guiding platform, said tape guide being mounted on said guiding platform, and means for lifting said guiding platform while its orientation remains substantially the same. Using such a guiding platform, it is possible to displace other optional elements mounted on the guiding platform, e.g. a pressure pad to press the tape against the head, at the same time as the tape guide.

Possibly in a device according to the invention said means for displacing comprise a movable reels platform which supports said take up and supply reel mechanism to accommodate transverse tape displacement. The tape guide position in front of the magnetic head varies substantially during transverse tape displacement. This means that a difference in height between the tape in front of the magnetic head and the tape at a take up reel and/or supply reel periphery may be so substantial that intolerable strains on the magnetic tape may result. Using the movable reels platform, the height difference may be compensated for without interfering with a precise displacement of the tape guide.

Also possibly in a device according to the invention said movable reels platform is provided with further tape guiding means acting on said longitudinal edges and respectively located downstream and upstream of said magnetic head. The further tape guiding means improve the reliability of tape transportation between the take-up or supply reel respectively and the tape guide in front of the magnetic head.

Yet also it is possible in a device according to the invention that said movable platform undergoes a translatory movement. While the movable reels platform is simultaneously moved with the tape guide the tape experiences only a minimal torsion during its transportation between the take-up or supply reel and the tape guide.

Further it is advantageous in a device according to the invention that said movable reels platform is pivotally mounted. From a mechanical point of view, this embodiment is relatively easy to realize.

In another way in a device according to the invention said means for displacing comprise a pair of tape guiding pins being arranged on the path of said tape between said reel and said tape guide so as to limit tape deformations to torsion. This embodiment may be preferred if the tape reels may not be moved.

In yet another way in a device according to the invention said pins are movable to accommodate the transverse tape displacement This is an advantage when a tape displacement movement range is large as compared to the tape width.

Usefully in a device according to the invention said means for tape transportation comprise capstan means which retract to enable said tape to be transversely displaced. The tape may be displaced with a maximum speed in the retracted capstan position.

Also usefully in a device according to the invention the active parts of the magnetic head are used for writing only, the active parts being arranged in a two dimensional matrix within a substantially planar surface of the magnetic head, and said reading means comprise a polarized light source, a magneto-optical transducer and a linear optical sensor. This embodiment allows to achieve a relatively high density of information on the tape.

Other advantages of the invention will become apparent from the following description taken in connection with the accompanying drawings wherein.

It will be understood that the above listed figures and the following related description are given by way of example only and that variation and modifications can be effected within the spirit and scope of the invention. For simplifying the explanation, the same elements are indicated with same reference numbers in FIGS. 1 to 9.

Figure 1:
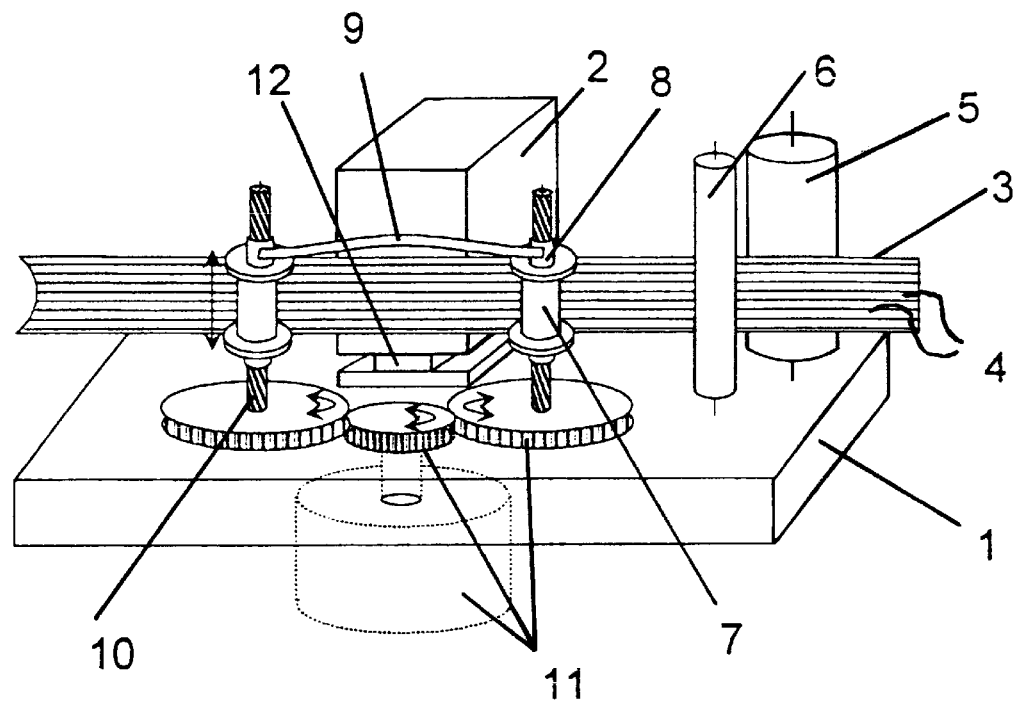
FIG. 1 is a view in perspective of a tape guide used in a device in accordance with the present invention.

An assembly shown in FIG. 1 is included in a device for reading and/or recording from/on a magnetic tape. FIG. 1 shows a support 1 and a writing and/or reading head 2, mounted on the support 1, which is used to write on a multitrack magnetic tape 3. A magnetic layer of tape 3 is magnetizable along a plurality of elementary tracks (not shown) forming bundles 4. The bundles 4 extend along a longitudinal axis which also corresponds to a direction of transportation. A roller 6 and a capstan 5 assure the transportation of tape 3.

Further transportation means and a reel mechanism for storing the tape on a take-up and a supply reel are not shown in FIG. 1. The magnetic head 2 comprises active parts (not shown) to write the elementary tracks bundled in bundles 4. The magnetic head 2 has a predetermined gap azimuth in relation to the longitudinal axis of bundles 4. It is important that the predetermined gap azimuth remain constant for all writing operations. The plurality of active parts may only write the elementary tracks of one bundle 4 at a time. The tape is displaced transversely, e.g. in a direction perpendicular to the longitudinal axis, in order for at least two different bundles 4 to selectively be accessed by the active parts. The displacement is achieved using a tape guide (7, 8, 9, 10, 1 1). The tape guide comprises a pair of guidance rollers 7 with flanges. The flanges act on longitudinal edges of tape 3 forcing tape 3 to remain between the flanges. The guidance rollers 7 rotate about nut bearings 8. The nut bearings 8 which are joined together by a rigid strip 9 which prevents the nut bearings from rotating. The nut bearings 8 may be displaced along screw means 10 when screw means 10 are actuated by a mechanism and a motor 11, e.g. stepper motor. The result is a transverse displacement of the tape 3. A typical width of bundle 4 may be e.g. in the order of 700 micrometers. Thus the displacement of the tape 3 would be done in steps of approximately 700 micrometers. The bundle 4 will typically bundle elementary tracks which have a width of e.g. 10 micrometers. The elementary tracks must be precisely positioned in front of the active parts of the magnetic head. A precision in the transverse movement of the tape guides 7 might not be sufficient to assure a precise positioning of the elementary track in front of the active parts. Therefore tracking means 12 may be used to perform a tracking movement of the magnetic head 2 keeping the elementary tracks in register with the active parts. The tracking means 12 may comprise an electromechanical transducer, e.g. a piezo-crystal, for raising and lowering the magnetic head 2. The predetermined gap azimuth should be unaffected by the tracking movement.

Figure 2:
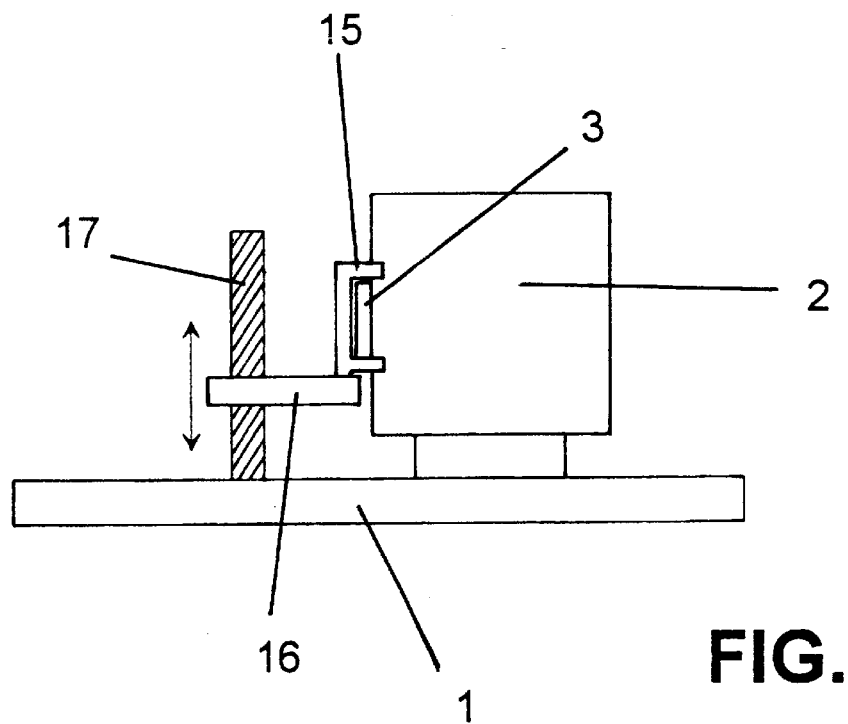
FIG. 2 is a schematic side view of a tape guide mounted on a guiding platform.

FIG. 2 shows another embodiment of tape displacing means. A tape guide may be realized using a guiding plate 15 having a recess wherein the tape is positioned. The guiding plate 15 is mounted on a guiding platform 16 which may be lifted along a transverse axis of a screw 17 vertically displacing the tape 3.

Figure 3:
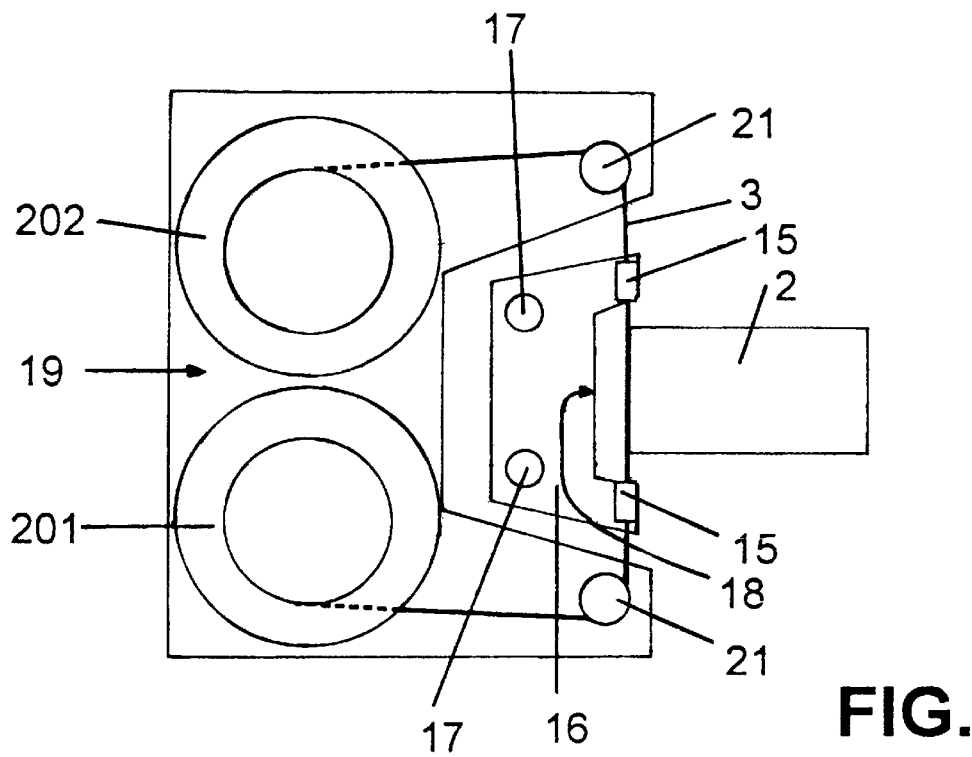
FIG. 3 is a top view of a guiding platform in accordance with the present invention.

FIG. 3 shows a top view of the guiding platform 16 situated in front of the magnetic head 2. The guiding platform 16 has a cut out edge 18 to allow a movement of the guiding platform 16 along the screw 17 without coming in contact with the magnetic head 2. The tape guides 15 additionally promote an intimate contact of the tape 3 with the active parts of the magnetic head 2. The top view shown in FIG. 3 also shows a movable reels platform 19 which supports a take up reel 201 and a supply reel 202. The movable reels platform 19 also supports further tape guiding means 21. The further tape guiding means 21 are located downstream and upstream of the magnetic head 2. They provide additional tape support and assure a precise definition of a tape transportation path between the take up and supply reels 201 and 202.

Figure 4:
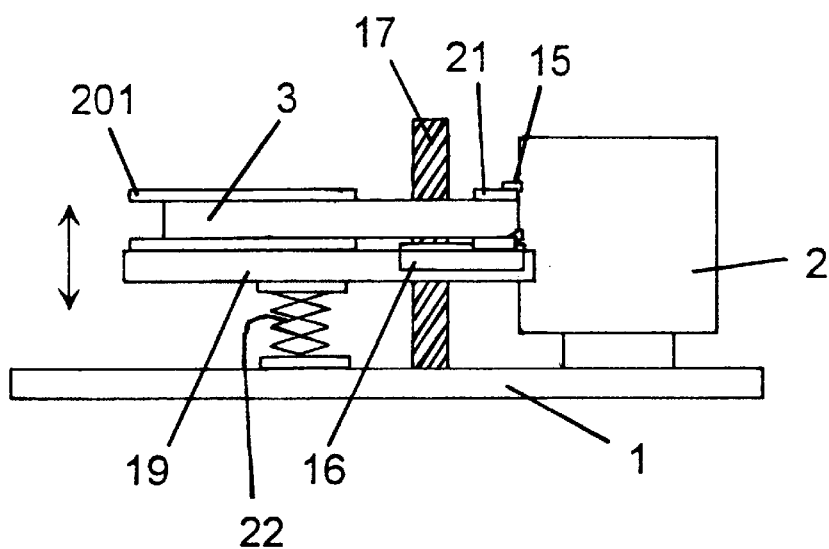
FIG. 4 is a side view of a device comprising a movable reels platform which may be translated.

The side view in FIG. 4 schematically shows how the movable reels platform 19 may be translated using an elevator means e.g. a lifting jack 22. The movable reels platform 19 stays parallel to itself while it undergoes the translatory movement. It is not mandatory that the movement of the movable reels platform 19 be exactly the same as the movement the guiding platform 16. Since the mass carried by the movable reels platform 19 is substantially greater then the mass carried by guiding platform 16, it is not necessary that they be displaced as a single unit. A precision requirement for displacing the tape 3 is easily obtained when moving the relatively low mass guiding platform 16. The movable reels platform 19 and the guiding platform 16 are moved simultaneously for avoiding an unfavorable deformation of tape 3 when tape 3 is transported between the take up and supply reels 201, 202 and the tape guide 15.

Figure 5:
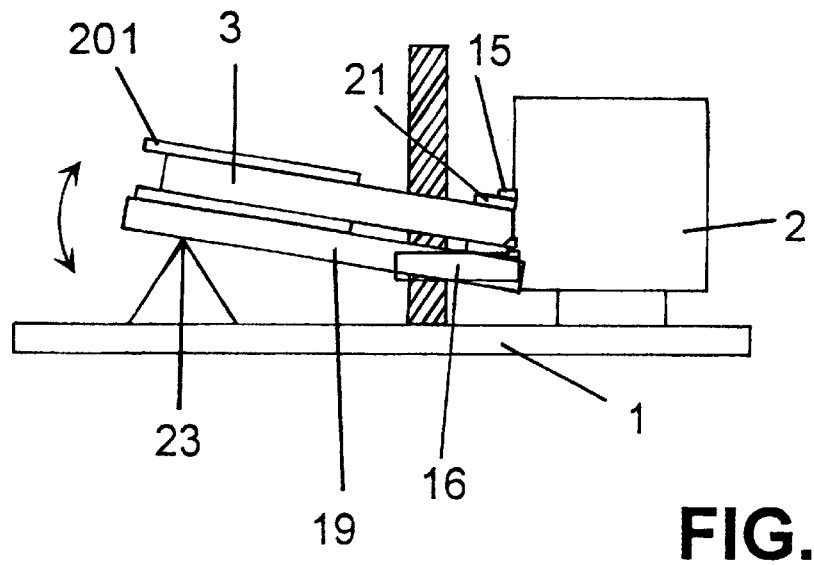
FIG. 5 is a side view of a device comprising a pivotally mounted movable reels platform.

The side view shown in FIG. 5 schematically demonstrates another way of moving the movable reels platform 19. The movable reels platform 19 is pivotally mounted to swing around an axis 23. The movable reels platform 19 is pivoted to keep the further tape guiding means 21 at substantially a same height as the tape guides 15 measured relatively to the magnetic head 2.

The pivotal accommodation of the transverse tape displacement is essentially aimed at reducing unfavorable tape deformations.

Figure 6:
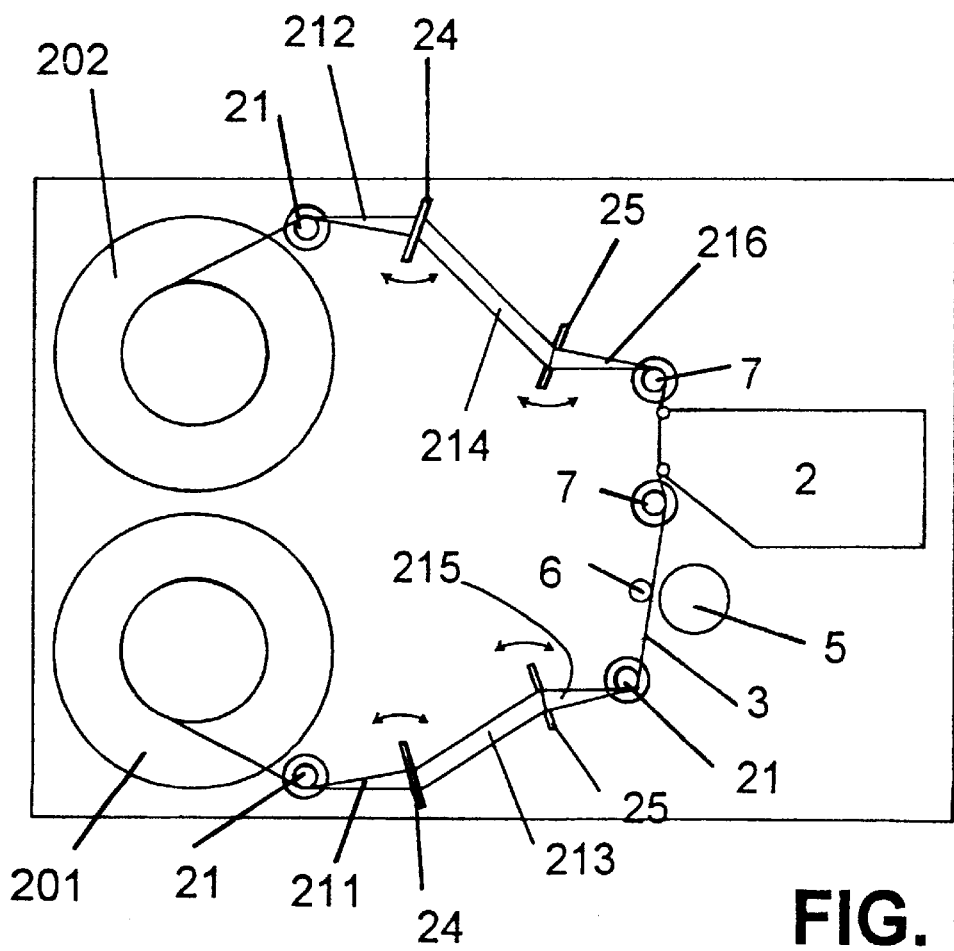
FIG. 6 is a top view of a device comprising two pair of guiding pins.

The top view shown in FIG. 6 presents a solution to accommodate for the transverse tape displacement using two pairs of pins 24 and 25. The pins 24 and 25 are respectively located on the path of the tape 3 between a reel 201, 202 and the tape guide. The tape guide comprises two guidance rollers 7. The pins 24 and 25 may be variably oriented as is symbolized by the curved double arrows in FIG. 6. The pins 24 and 25 force the tape to adopt several torsions; a first torsion 211, 212 is achieved between a further tape guide 21 at a periphery of the take up reel 201 or supply reel 202 and a pin 24. The plane of the tape is then kept in a constant orientation (213, 214) until it reaches pin 25 where the tape is forced in another torsion 215, 216 which extends until the tape reaches another further tape guide 21 or a guidance roller 7 respectively. The orientation of the pins 24 and 25 depends on the transverse tape displacement. A means for orienting the pins 24 and 25 is not shown in FIG. 6. This means for orienting may e.g. comprise a cam mechanism. It will be noted that while tape 3 is being displaced transverse!y, the capstan 5 is in retracted position as shown in FIG. 6. This means that the tape 3 is not anymore pinched between the roller 6 and the capstan 5 as during normal tape transportation. This allows a more rapid and prompt transverse displacement of tape 3 without unwanted deformations.

Figure 7:
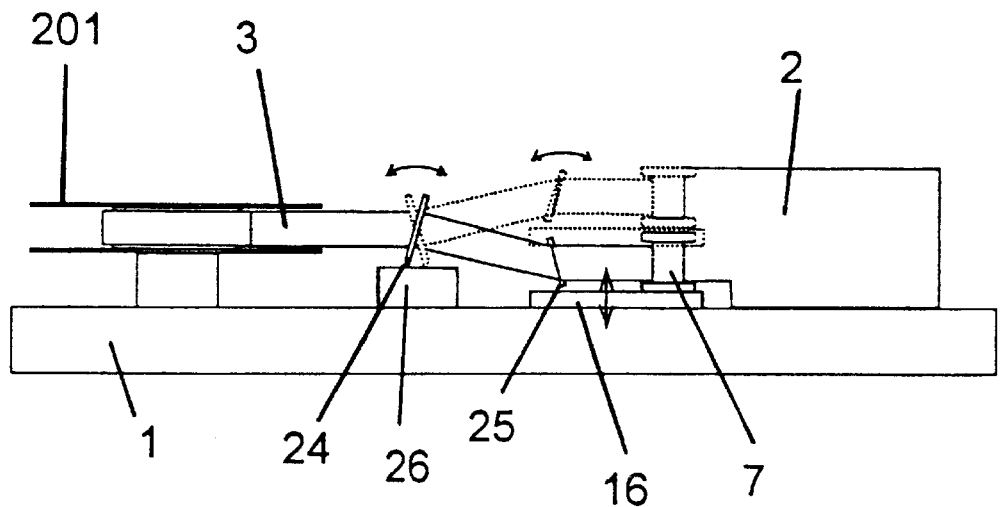
FIG. 7 is a side view of a device showing a pair of movable guiding pins.

As illustrated in FIG. 7 the pin 25 may be mounted together with the tape guidance rollers 7 on a guiding platform 16. The guiding pins 24 and 25 take different orientation depending on whether the guiding platform 16 is in a low position (shown in full lines) or in a high position (shown in dotted lines). The guiding pin 24 is elevated at a height of the tape reel 201 or 202 using a stationary guiding pin platform 26. The height of the guiding pin 24 is halfway between the low and the high position of the guiding pin 25.

Figure 8:
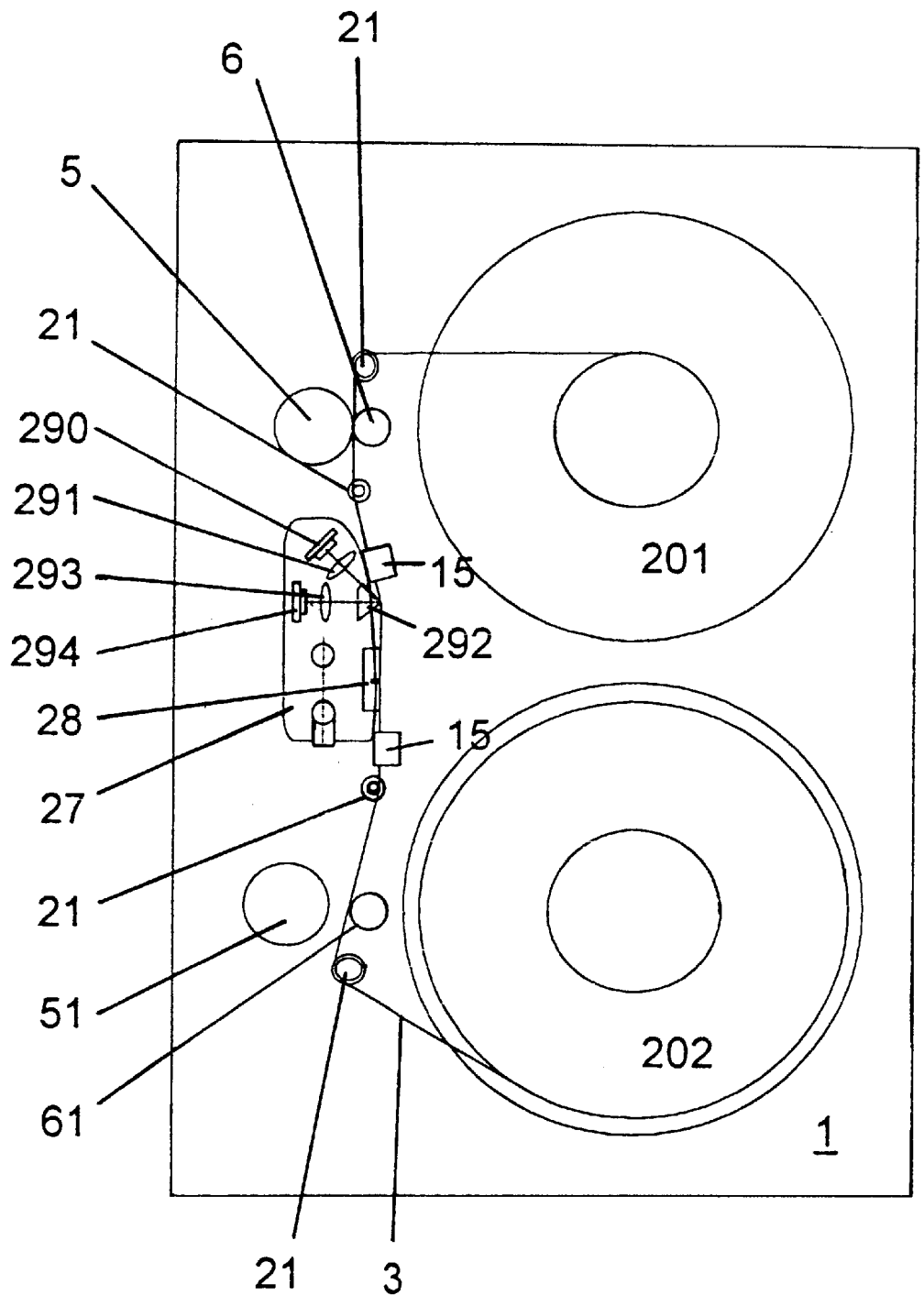
FIG. 8 is a top view of a device showing retractable capstans means and a head assembly comprising a magnetic head and optical reading means.

The example of a device according to the present invention shown in FIG. 8 features two capstans 5 and 51 and two rollers 6 and 61, allowing tape transportation in two ways in longitudinal direction. The example also features a head assembly 27 comprising a magnetic head 28 having active parts for writing only. The head assembly 27 further comprises optical reading means. The optical reading means comprise a polarized light source 290, cylindrical focusing optics 291, a magneto-optical transducer 292, imaging optics 293 and a linear optical sensor 294. Tape guides 15 guide the tape 3 in front of the head assembly 27 thus in front of the magnetic head and the optical reading system.

Figure 9:
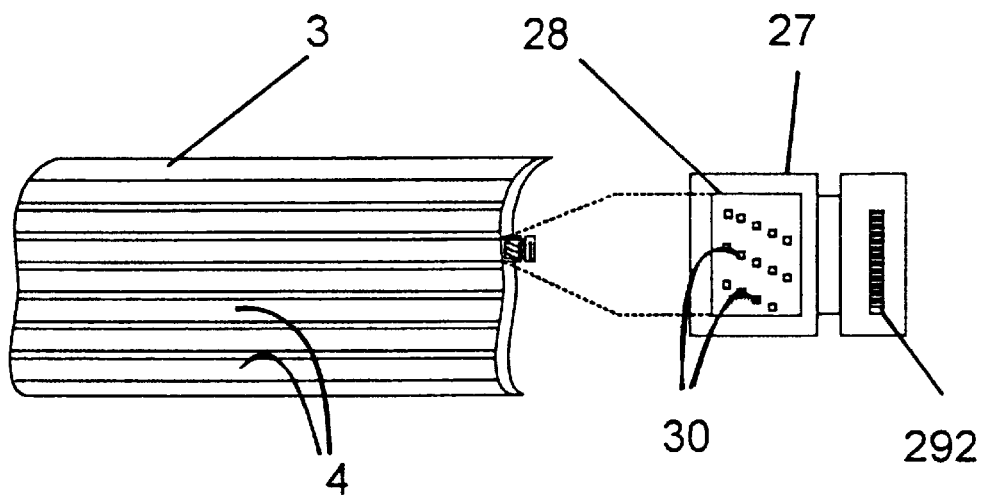
FIG. 9 is a view of a piece of tape carrying a plurality of bundles and a front view of a writing and reading head used to address a bundle.

FIG. 9 shows a front view of the head assembly 27 used in FIG. 8. The head assembly 27 is greatly magnified compared to the width of a bundle 4 shown as being carried by a piece of tape 3. Active parts 30 are arranged in a two dimensional matrix within a substantially planar surface of the magnetic head 28. The two dimensional matrix of active parts 30 allows to read all the elementary tracks bundled in one bundle 4. Thereby each elementary track is addressed by one active part 30. The magneto-optical transducer 292 allow to read all the elementary tracks of one bundle 4 simultaneously.

What is claimed is:

1. A device for reading and/or recording from/on a magnetic tape, said magnetic tape having a longitudinal axis along which extends a magnetic layer magnetizable along a plurality of elementary tracks to form a plurality of bundles of longitudinally magnetized tracks oriented parallel to said longitudinal axis across a width of said tape, said device comprising:

a take up and supply reel mechanism, tape transportation means associated with said reel mechanism for causing said tape to slide against a magnetic head having a plurality of active parts for respectively reading/recording said plurality of elementary tracks, said magnetic head having a predetermined gap azimuth in relation to said longitudinal axis and said tape being in intimate contact with all active parts of said head, said device being characterized in that it further comprises, for achieving a bundle selection from said tape to be recorded or read, means for displacing in a transverse direction said tape in relation with said head.

2. A device according to claim 1 wherein for reading said bundle it comprises tracking means causing said elementary tracks to be kept in register with track reading means.

3. A device according to claim 2 characterized in that said tracking means perform a movement of said track reading means transversely of said longitudinal axis.

4. A device according to either one of claims 2 or 3 characterized in that said tape has longitudinal edges and said means for displacing comprise a tape guide acting on said longitudinal edges, said tape guide causing said tape to undergo a translation thereby preserving said predetermined gap azimuth.

5. A device according to claim 4 characterized in that said tape guide comprises a pair of guidance rollers with flanges, each guidance roller freely rotating about a nut bearing, and screw means for transversely and simultaneously displacing said nut bearings.

6. A device according to claim 5 in which said screw means are actuated with a stepper motor.

7. A device according to claim 4 characterized in that said means for displacing comprise a guiding platform, said tape guide being mounted on said guiding platform, and means for lifting said guiding platform while its orientation remains substantially the same.

8. A device according to claim 4 characterized in that said means for displacing comprise a movable reels platform which supports said take up and supply reel mechanism to accommodate said transverse tape displacement.

9. A device according to claim 8 characterized in that said movable reels platform is provided with further tape guiding means acting on said longitudinal edges and respectively located downstream and upstream of said magnetic head.

10. A device according to claim 9 wherein said movable reels platform undergoes a translatory movement.

11. A device according to claim 8 or characterized in that said movable reels platform is pivotally mounted.

12. A device according to claim 4 characterized in that said means for displacing comprise a pair of tape guiding pins being arranged on the path of said tape between said reel and said tape guide so as to limit tape deformations to torsion.

13. A device according to claim 12 wherein said pins are movable to accommodate the transverse tape displacement.

14. A device according to claim 2 characterized in that said means for tape transportation comprise capstan means which retract to enable said tape to transversely displaced.

15. A device according to claim 2 characterized in that said active parts of said magnetic head are used for writing only, said active parts being arranged in a two dimensional matrix within a substantially planar surface of said magnetic head, and that said reading means comprise a polarized light source, a magneto-optical transducer and a linear optical sensor.

16. A device according to claim 1 wherein said tape has longitudinal edges and said means for displacing comprise a tape guide acting on said longitudinal edges, said tape guide causing said tape to undergo a translation thereby preserving said predetermined gap azimuth.

* * * * *